(12) United States Patent
Demsky et al.

(10) Patent No.: US 7,752,264 B2
(45) Date of Patent: *Jul. 6, 2010

(54) CONTROLLING INSTANT MESSAGING SETTINGS BASED ON CALENDAR APPLICATION ENTRIES

(75) Inventors: Scott H. Demsky, Boca Raton, FL (US); William R. Ferguson, Boca Raton, FL (US); Peter J. Guasti, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/396,946

(22) Filed: Mar. 3, 2009

(65) Prior Publication Data

US 2009/0164578 A1 Jun. 25, 2009

Related U.S. Application Data

(63) Continuation of application No. 10/999,031, filed on Nov. 29, 2004, now Pat. No. 7,519,660.

(51) Int. Cl.
*G06F 15/16* (2006.01)

(52) U.S. Cl. .................. 709/204; 709/206; 709/217; 709/219; 709/229

(58) Field of Classification Search ......... 709/204–206, 709/217, 219, 229
See application file for complete search history.

(56) References Cited

U.S. PATENT DOCUMENTS

| | | | |
|---|---|---|---|
| 5,107,443 A | 4/1992 | Smith et al. | |
| 5,872,925 A | 2/1999 | Han | |
| 6,356,924 B2 | 3/2002 | Mullen-Schultz | |
| 6,640,230 B1 | 10/2003 | Alexander et al. | |
| 6,938,213 B2 | 8/2005 | Brown et al. | |
| 6,988,128 B1 | 1/2006 | Alexander et al. | |
| 7,146,404 B2 | 12/2006 | Kay et al. | |
| 7,221,942 B2 * | 5/2007 | Jung et al. | 455/435.1 |
| 7,284,002 B2 * | 10/2007 | Doss et al. | 709/204 |
| 7,337,210 B2 * | 2/2008 | Barsness | 709/204 |
| 7,383,308 B1 * | 6/2008 | Groves et al. | 709/206 |
| 7,418,497 B2 * | 8/2008 | Hagale et al. | 709/203 |
| 2002/0023132 A1 | 2/2002 | Tornabene et al. | |
| 2003/0046296 A1 * | 3/2003 | Doss et al. | 707/102 |
| 2003/0065721 A1 * | 4/2003 | Roskind | 709/204 |
| 2003/0191685 A1 | 10/2003 | Reese | |
| 2004/0034688 A1 | 2/2004 | Dunn | |
| 2004/0136938 A1 * | 7/2004 | Ladislas et al. | 424/70.13 |
| 2005/0055412 A1 * | 3/2005 | Kaminsky et al. | 709/207 |

* cited by examiner

*Primary Examiner*—Phuoc Nguyen
(74) *Attorney, Agent, or Firm*—Novak Druce + Quigg

(57) ABSTRACT

A method for adjusting an instant messaging control mechanism can include the steps of determining a control setting for an instant messaging control mechanism based upon a calendar application entry, and responsive to the determining step, automatically adjusting the instant messaging control mechanism to the control setting. In one embodiment, the determining step can be performed by a calendar application to which the calendar application entry corresponds and can be performed responsive to a calendar event. In a further embodiment, the calendar application can establish a time at which the control setting is to be adjusted. The adjusting step can occur at approximately the established time, where the calendar event can occur in advance of the established time.

5 Claims, 3 Drawing Sheets

CONTROLLING INSTANT MESSAGING SETTINGS BASED ON CALENDAR APPLICATION ENTRIES

CROSS-REFERENCE TO RELATED APPLICATION

This application is a continuation of, and accordingly claims the benefit of, U.S. patent application Ser. No. 10/999,031, now issued U.S. Pat. No. 7,519,660, which was filed on Nov. 29, 2004, and which is hereby incorporated by reference in its entirety.

BACKGROUND

1. Field of the Invention

The present invention relates to the field of instant messaging and, more particularly, to automatically controlling instant messaging settings based on calendar application entries.

2. Description of the Related Art

Conventional instant messaging (IM) systems provide a means of conducting electronic conversations between two or more computing device users with the immediacy of a spoken conversation. Instant messaging systems provide a manually configurable control mechanism that permits users to adjust their availability to other users. This control mechanism can indicate that a user is Off Line, Away from Desk, At Lunch, In a Meeting, Available, and the like. The control mechanisms can also block one or more incoming messages, automatically reply to incoming messages with a pre-configured response, and can remove a user from a colleague's list of IM contacts. Further, the control mechanisms can be specifically applied to all IM users, to a user category, or to one or more specified users.

While these control mechanisms can be very useful, conventional implementations of these control mechanisms require users to manually enable and disable the settings. The manual nature of the control mechanisms leads to users forgetting to make setting adjustments, thereby causing users to falsely indicate their communication availability. For example, an IM user can be in a meeting, where the user doesn't wish to receive IM messages for the duration of the meeting, yet that user can forget to turn off their availability to messages. Conversely, the user can remember to turn off availability at the start of a meeting, but forget to turn their availability back on when the meeting concludes. This general problem, inherent in manual control mechanisms, can manifest itself in many different scenarios, where a user inadvertently establishes an incorrect state for IM communications through forgetfulness.

SUMMARY OF THE INVENTION

The present invention discloses a system, a method, and an apparatus for controlling instant messaging (IM) availability based upon calendar application entries. According to an embodiment of the disclosed invention, different calendar application settings can be established for different types of calendar entries so that the calendar application settings can determine default behavior for controlling IM availability. Values other than the defaults can be specified by a user whenever a calendar entry is created, edited, or whenever a notification concerning the calendar entry is received. The calendar application can be used to control the type of IM availability, a set of users to which IM availability settings are to be applied, a duration for which IM availability settings are to be applied, or combinations and derivations thereof.

Specifically, one aspect of the present invention can include a method for adjusting an instant messaging control mechanism. The method can include the steps of determining a control setting for an instant messaging control mechanism based upon a calendar application entry, and responsive to the determining step, automatically adjusting the instant messaging control mechanism to the control setting. In one embodiment, the determining step can be performed by a calendar application to which the calendar application entry corresponds and can be performed responsive to a calendar event. In a further embodiment, the calendar application can establish a time at which the control setting is to be adjusted. The adjusting step can occur at approximately the established time, where the calendar event can occur in advance of the established time.

Another aspect of the present invention can include a system for adjusting an instant messaging control mechanism. The system can include a calendar application, an instant messaging application, and a control mechanism adjustment routine. The calendar application can create, edit, and receive notifications concerning calendar entries. The instant messaging application can have a configurable control mechanism for adjusting instant messaging availability settings. The control mechanism adjustment routine can detect calendar application events and can responsively adjust instant messaging availability settings. The control mechanism adjustment routine can execute separately from routines of the instant messaging application and can be integrated with the calendar application. For example, the control mechanism adjustment routine can be a routine of the calendar application, a plug-in module for calendar application, or implemented in another fashion such that a tight coupling between the control mechanism adjustment routine and the calendar application exists.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
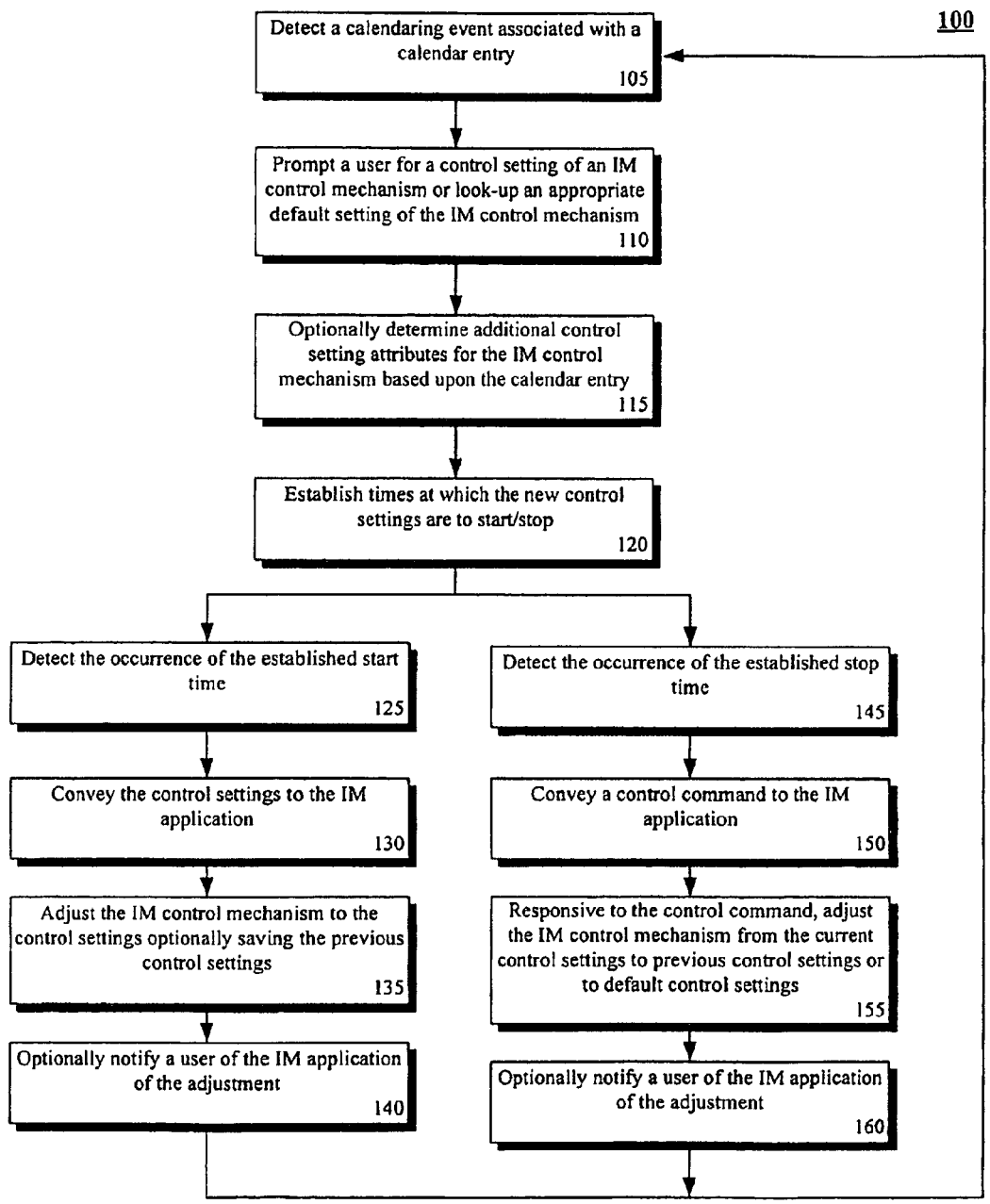
FIG. 1 is a flow chart of a method for adjusting instant messaging controls based upon one or more entries within a calendar application in accordance with an embodiment of the inventive arrangements disclosed herein.

FIG. 1 is a flow chart of a method 100 for adjusting instant messaging controls based upon one or more entries within a calendar application in accordance with an embodiment of the inventive arrangements disclosed herein. The method 100 can be performed in the context of a computing environment that includes at least one instant messaging (IM) application and at least one calendar application, where the method 100 can be performed using a software routine that is directly coupled to or integrated within the calendar application. Method 100 can allow a user to control IM application settings, particularly those settings pertaining to availability, from entries in the calendar application. It should be appreciated that controlling IM availability from a calendar application results in an intuitive user interface since many of the reasons for altering IM availability result from events described by entries in a user's calendar application.

Method 100 can begin in step 105, where a calendar event associated with a calendar entry can be detected. Calendar events can, for example, include events of creating a calendar application entry, editing a calendar application entry, and receiving a notification for a calendar application entry. In step 110, a control setting for an IM control mechanism can be determined. The control setting can include an availability setting. The control setting can be automatically established or can be user provided. That is, a user can be prompted for a control setting for the IM control mechanism. Alternatively, a default setting can be looked up that corresponds to the calendar application entry that initiated the calendar event.

In step 115, additional control setting attributes for the IM control mechanism can be optionally determined based upon the calendar entry. The additional control settings can, for example, be settings particular to a specific IM application. In step 120, a time at which determined control settings are to be applied can be established. The time can be necessary since the calendar event can occur in advance of the established time.

For example, a calendar event can result from the creation of a calendar entry. When the user inputs a calendar entry like a meeting, that same user can specify an IM availability setting that is to be applied at the time of the meeting. Accordingly, the user provided IM availability settings are not to be applied until the meeting begins.

In step 125, the occurrence of the established start time can be detected. In step 130, the control settings can be conveyed to the IM application. In step 135, an IM control mechanism can adjust the IM application settings to the conveyed settings. Previous control settings can be optionally saved during this step so that the IM application settings can be returned to their original state upon the detection of an established stop time. In step 140, a user of the IM application can be optionally notified of the adjustment. In one embodiment, the notification can require user approval before the adjustment can be made. In another embodiment, the adjustment to the IM application can be performed without the user of the IM application being aware of its occurrence.

The method can proceed from step 140 back to step 105, where a new calendaring event can be detected and the method repeated. In one embodiment, the method can alternately proceed from step 140 to step 145, where the method can detect an established stop time corresponding to the start time of step 125 (so that settings can be re-adjusted responsive to the occurrence of the stop time).

After a stop time has been established in step 120, step 145 can occur when the occurrence of the established stop time is detected, thereby causing the method to proceed from step 120 (or step 140) to step 145. In step 150, a control command can be conveyed to the IM application that indicates the stop time has occurred. In one embodiment, the control command can include the control settings that are conveyed to the IM application. In another embodiment, the control command can include an indicator that causes the IM application to utilize one or more previously stored control settings.

In step 155, responsive to the control command, the IM control mechanism can be adjusted from the current control setting to previously established control settings, to default control settings, or to control settings included within the control command (or conveyed with the control command). In step 160, a user can be optionally notified of the adjustment.

It should be appreciated that the method 100 is not limited to interactions between a calendar application and the IM application, but can also be utilized for interactions between a calendar application and one or more applications other than the IM application. That is, any application that would benefit from knowing the availability of a user via information on their calendar could be conveyed the control settings and could responsively perform application specific actions. Applications that interact with the calendar application can include, but are not limited to, a message forwarding application, a teleconferencing application, an email application, an automated secretarial application, a collaboration application, and the like.

For example, one of the applications can be an application for a telephone answering system. To illustrate, when control settings from the calendar application indicate that a user is away from their desk, the telephone answering application can play a message such as "I am not at my desk right now, please leave a message" instead of permitting the phone to ring.

Figure 2:
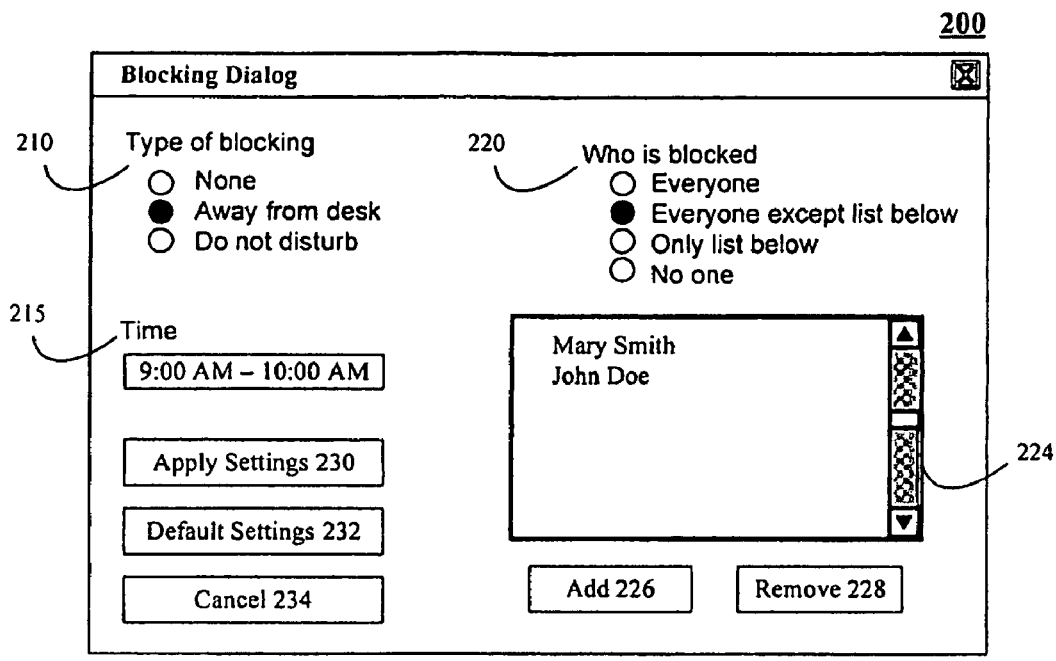
FIG. 2 is a graphical user interface of a blocking dialog that prompts a user to provide control settings for adjusting one or more IM availability settings in accordance with an embodiment of the inventive arrangements disclosed herein.

FIG. 2 is a graphical user interface (GUI) 200 of a dialog that prompts a user to provide control settings for adjusting one or more IM availability settings in accordance with an embodiment of the inventive arrangements disclosed herein. GUI 200 can be presented to a user responsive to an occurrence of a calendar event of an associated calendar application so as to grant a user the capability of specifying IM availability status during a time interval corresponding to a related calendar entry. The calendar event can result from a creation of a new calendar entry, the processing of an existing calendar entry, the receiving of a meeting notice associated with a calendar entry, and other such occurrences.

Selections made within GUI 200 can result in corresponding changes occurring within an associated IM application. The associated IM application can include an IM client residing on the machine upon which GUI 200 is presented or can be any other designated IM client including clients remotely located from the machine upon which GUI 200 is presented.

GUI 200 can include a type of blocking section 210, a time section 215, and a who is blocked section 220. Section 210 can provide a selection of the privacy features for the associated IM application. Section 210 can default to the least restrictive type of blocking unless otherwise configured by user-specific default settings. Additionally, individual entries of section 210 can be altered to correspond to blocking options associated with the IM application.

The time section 215 can define an interval that GUI 200 settings are to remain in effect. Section 215 settings can default to the interval of the associated calendar entry. Further, section 215 can define a setting start time (not shown) as opposed to an interval, where the start time represents the time at which the settings are to be applied. Additionally, both the interval and the start time can include a date range or date (not shown) for which the interval is to apply or for which the setting is to be applied.

The who is blocked section 220 can provide a means for selecting individuals to whom the IM availability settings are to be applied. Section 220 can be selectively applied to everyone, to everyone except those people in list 224, to only those people in list 224, or to no one. The list 224 can be modified by an add button 226 that adds people from a contact list associated with the IM application and by a remove button 228 that removes a selected person from the list 224.

Additionally, GUI 200 can include an apply settings button 230, a default settings button 232, and a cancel button 234. The cancel button 234 can cause the settings of GUI 200 to be ignored and the GUI 200 to close. The default settings button 232 can cause the settings within GUI 200 to be changed back to a default state. The apply settings 230 button can cause the GUI 200 settings to be applied to the associated IM application.

It should be appreciated that GUI 200 is for illustrative purposes only and that the invention is not to be limited to the precise arrangements included herein. It should be appreciated that alternative interfaces contemplated herein can include additional user elements and derivatives of the shown elements, which can be included in whole or in part in the contemplated alternative interfaces. Further, the alternative interfaces can include, but are not limited to, graphical interfaces, audible interfaces, tactile interfaces, and multimodal interfaces. Moreover, the GUI 200 can be adapted so as to permit a user to establish default settings that are to be applied to application events and categories of application entries.

Additionally, it should be noted that the GUI 200 can be an interface integrated with a calendar application or can be part of a stand-alone application that can be coupled to the calendar application. GUI 200 can also be specifically adjusted, even dynamically, to be synchronized with the configurable settings of an associated IM application. Further, the GUI 200 can be adjusted to provide settings to adjust availability settings of one or more additional applications other than an IM application. For example, the GUI 200 can be adjusted to provide settings for a telephone answering system or other such additional application.

Figure 3:
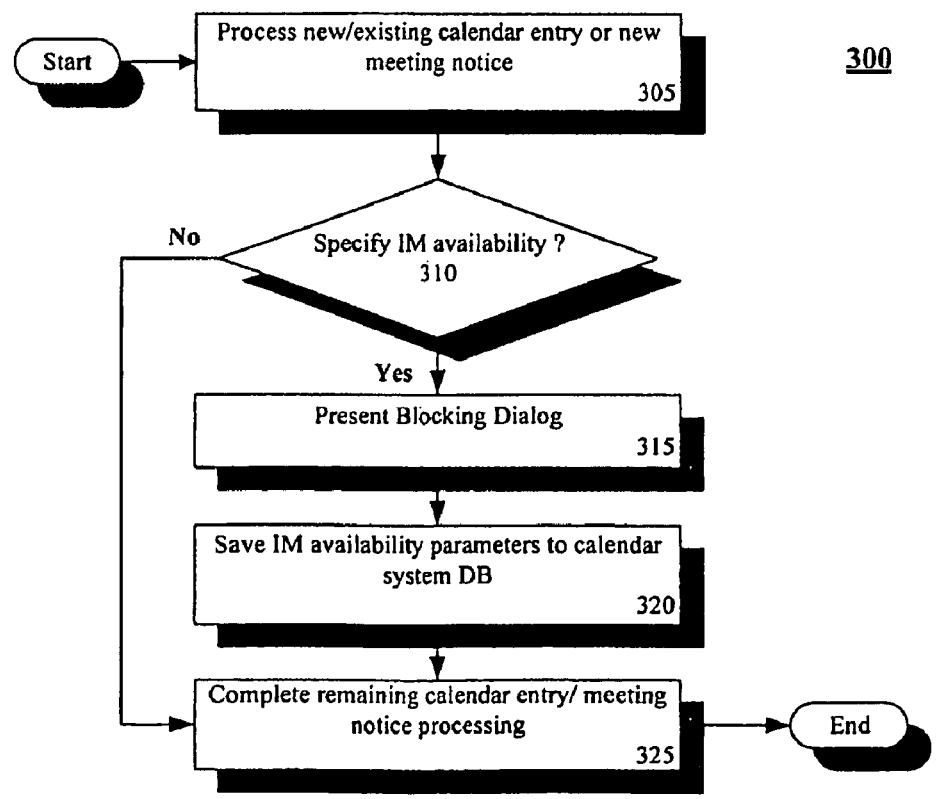
FIG. 3 is a flow chart of a method for utilizing a blocking dialog in the context of a calendar application in accordance with an embodiment of the illustrative arrangements disclosed herein.

FIG. 3 is a flow chart of a method 300 for utilizing a blocking dialog, such as GUI 200, in the context of a calendar application in accordance with an embodiment of the illustrative arrangements disclosed herein. After starting, method 300 can proceed to step 305, where a new or existing calendar entry or new meeting notice can be processed. In step 310 a decision can be made as to whether IM availability is to be specified for the calendar entry. If not, the method can proceed from step 310 to step 325 where the calendar entry/meeting notice processing can be completed.

If IM availability is to be specified, the method can proceed from step 310 to step 315, where the blocking dialog can be presented. A user can provide input into the blocking dialog from which IM availability parameters are constructed. In step 320, the IM availability parameters can be saved to a calendar system data base or other storage space. After storing the parameters, the method can proceed to step 325, where the calendar entry/meeting notice processing can continue.

Figure 4:
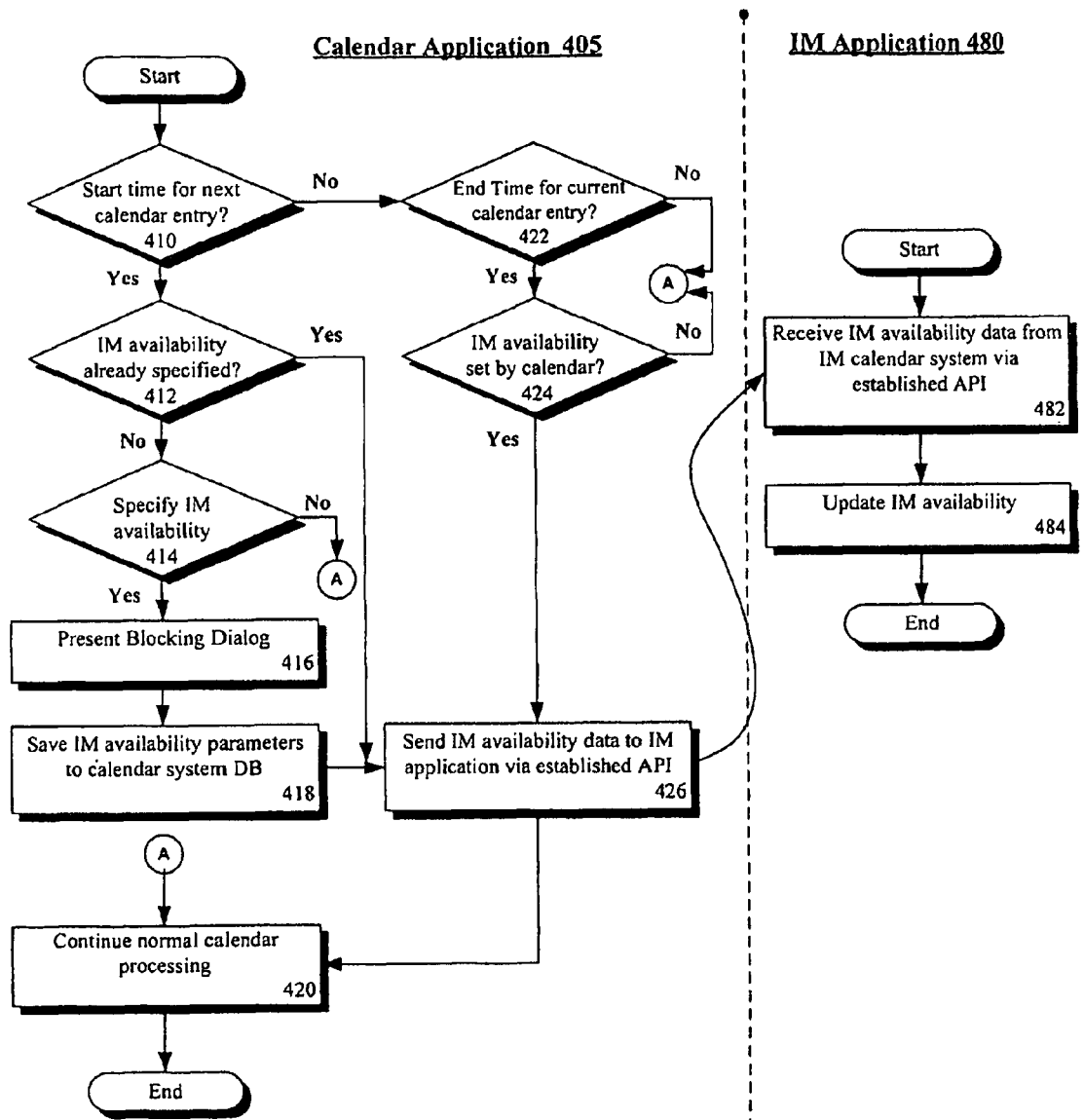
FIG. 4 is a flow chart showing an interaction between a calendar application and an IM Application and steps taken by each during the interaction in accordance with an embodiment of the present invention.

FIG. 4 is a flow chart showing an interaction between a calendar application 405 and an IM application 480 and steps taken by each during the interaction in accordance with an embodiment of the present invention.

The calendar application 405 can start processing in step 410, where a determination can be made whether a current time indicates the occurrence of a start time for the next calendar entry of the calendar application 405. If not, the method can proceed to step 422, where a decision as to whether a current calendar entry's end time has occurred can be made. If the end time hasn't occurred, the method can proceed from step 422, to step 420, where normal calendar processing can continue. If the end time has occurred, the method can proceed from step 422 to step 424, where a check can be made as to whether IM availability has been set by the calendar application 405. If not, the method can proceed to step 420, where normal calendar processing continues. If, however, IM availability is set in step 424, the method can proceed to step 426, where the IM availability data can be sent to the IM application 480 through a previously established conduit, such as an application program interface (API) for the IM application 480. The calendar application 405 can proceed from step 426 to step 420, where normal calendar processing can continue.

If the start time is indicated in step 410, the method can proceed from step 410 to step 412, where a determination can be made as to whether IM availability has been already specified. If so, the method can proceed from step 412 to step 426, where the IM availability data can be sent to the IM application 480.

If no IM availability has been specified in step 412, the method can proceed from step 412 to step 414, where a determination can be made as to whether IM availability is to be specified. If not, the method can jump to step 420, where normal calendar processing can continue. If IM availability is to be specified, the method can proceed from step 414 to step 416, where a blocking dialog can be presented. Input can be provided in the blocking dialog. The input can result in a specification of one or more IM availability parameters or a change being made to one or more previously established IM availability parameters. In step 418, the IM availability parameters can be saved to a calendar data base or other data store. From step 418, the method can proceed to step 426, where the IM availability data can be sent to IM application 480.

The IM application 480 can start processing in step 482, when it receives IM availability data from the calendar application 405. In step 484, the IM application 480 can update IM availability in accordance with the received IM availability data. After step 484, the IM application 480 can continue normal processing operations.

It should be appreciated that adaptive variations of the arrangements of FIG. 4 are contemplated herein and that the invention is not to be limited to the exact arrangements shown in the illustrative embodiment. For example, in one variation, an optional user notification step (not shown) can be performed to inform a user that a change is about to be made (or has already been made) to the IM application 480 based upon the IM availability data conveyed from the calendar application 405. Further, the notification step may optionally require user approval before the IM availability is updated in step 484, where no update occurs without explicit user approval. In variations where the notification step occurs, the notification can be performed within the calendaring application 405 before, after, or during step 426 or can be performed within the IM application 480 before, after, or during step 484.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer system for adjusting instant messaging control settings of an instant messaging application in a computing environment that includes at least one instant messaging application and at least one calendar application, the system comprising:
   at least one memory; and
   at least one processor configured to:
      detect a calendar event associated with a calendar entry of the calendar application, the calendar event including at least one of a creation of the calendar entry, an editing of the calendar entry, and a receipt of a notification for the calendar entry;
      upon detection of the calendar event, prompt a user of the instant messaging application for a manual adjustment to a control setting or an automatic adjustment based on the calendar application entry;
      adjust the control setting manually by the user if the manual adjustment to the control setting is selected;
      look up a default setting and adjust the control setting automatically to the default setting if the automatic adjustment of the control setting is selected, wherein the calendar application is remote from the instant messaging application and the control setting is conveyed from the remote application to the instant messaging application across a network;
      determine an availability setting within the remote application for at least one additional application other than the instant messaging application based upon the calendar application entry;
      convey the availability setting from the remote application to the at least one additional application across a network; and
      automatically adjust a setting of the at least one additional application in accordance with the availability setting.

2. The computer system of claim 1, wherein the control mechanism adjustment routine further comprises:
   a user interface for prompting a user for input regarding the instant messaging availability settings, wherein the control mechanism adjustment routine adjusts the instant messaging availability settings in accordance with input received through the user interface.

3. The computer system of claim 2, wherein the user interface comprises:
   an interface element for a user to specify a type of availability blocking;
   an interface element for a user to specify a set of users that are to be affected by the by one of the adjustments to the instant messaging availability settings; and
   an interface element for a user to specify a duration for which one of the adjustments to the instant messaging availability settings is to be applied.

4. A machine-readable storage having stored thereon, a computer program having a plurality of code sections, said code sections executable by a machine for causing the machine to perform the steps of:
   detecting a calendar event associated with a calendar entry of a calendar application, the calendar event including at least one of a creation of the calendar entry, an editing of the calendar entry, and a receipt of a notification for the calendar entry;
   upon detection of the calendar event, prompting a user of an instant messaging application for a manual adjustment to a control setting or an automatic adjustment based on the calendar application entry;
   adjusting the control setting manually by the user if the manual adjustment to the control setting is selected;
   looking up a default setting and adjusting the control setting automatically to the default setting if the automatic adjustment of the control setting is selected, wherein the calendar application is remote from the instant messaging application and the control setting is conveyed from the remote application to the instant messaging application across a network;
   determining an availability setting within the remote application for at least one additional application other than the instant messaging application based upon the calendar application entry;
   conveying the availability setting from the remote application to the at least one additional application across a network; and
   automatically adjusting a setting of the at least one additional application in accordance with the availability setting.

5. The machine-readable storage of claim 4, wherein the calendar application establishes a time at which the adjusted control setting is to be applied, wherein the calendar event occurs in advance of the established time.

* * * * *